(12) United States Patent
Yoshioka et al.

(10) Patent No.: US 8,864,173 B2
(45) Date of Patent: Oct. 21, 2014

(54) SEAT BELT RETRACTOR AND SEAT BELT APPARATUS INCLUDING THE SAME

(75) Inventors: Hirokazu Yoshioka, Tokyo (JP); Kenji Osada, Tokyo (JP); Takashi Sesaki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/807,692

(22) PCT Filed: Jun. 3, 2011

(86) PCT No.: PCT/JP2011/003147
§ 371 (c)(1),
(2), (4) Date: Mar. 4, 2013

(87) PCT Pub. No.: WO2012/001878
PCT Pub. Date: Jan. 5, 2012

(65) Prior Publication Data
US 2013/0175845 A1 Jul. 11, 2013

(30) Foreign Application Priority Data
Jul. 1, 2010 (JP) ................................. 2010-151268

(51) Int. Cl.
*B60R 22/36* (2006.01)
*B60R 22/38* (2006.01)
(52) U.S. Cl.
CPC ............. *B60R 22/36* (2013.01); *B60R 22/38* (2013.01)
USPC ...................................................... 280/806
(58) Field of Classification Search
CPC ........ B60R 22/34; B60R 22/36; B60R 22/38; B60R 22/405
USPC ........ 297/476; 280/806, 807; 242/379.1, 384, 242/384.6, 383.4
See application file for complete search history.

(56) References Cited

U.S. PATENT DOCUMENTS

| 4,509,707 A | 4/1985 | Ernst et al. |
| 5,332,291 A * | 7/1994 | Fujimura et al. .............. 297/480 |

(Continued)

FOREIGN PATENT DOCUMENTS

| DE | 10 2007 051 572 A1 | 4/2009 |
| JP | S56-163668 A | 12/1981 |

(Continued)

OTHER PUBLICATIONS

International Search Report from the International Bureau of WIPO for International Application No. PCT/JP2011/003147 dated Jul. 5, 2011 and English translation of the same (2 pages).

*Primary Examiner* — Paul N Dickson
*Assistant Examiner* — Robert A Coker
(74) *Attorney, Agent, or Firm* — Fitch, Evan, Tabin & Flannery, LLP

(57) ABSTRACT

A seat belt retractor is provided that realizes the proper meshing between a plurality of internal teeth and external teeth with a simple movement of a spool. In the case of an emergency, external teeth of a pawl provided at a spool right side end mesh with internal teeth provided on a frame, and, with load acting on a seat belt, a spool left side end contacts a spool guide. Since the spool left side end tends to move further in the direction of seat belt load, the spool guide brings one external tooth at the spool left side end into contact with one target internal tooth provided on the frame. Hence, some of the spool external teeth are made to mesh properly with the respective internal teeth. Thus, some of the spool external teeth effectively mesh with the respective frame internal teeth with simple movement of the spool.

7 Claims, 4 Drawing Sheets

(56) References Cited

U.S. PATENT DOCUMENTS

| | | | |
|---|---|---|---|
| 5,482,224 A * | 1/1996 | Fujimura et al. | 242/376 |
| 5,577,683 A | 11/1996 | Imai | |
| 5,765,774 A * | 6/1998 | Maekawa et al. | 242/390.9 |
| 6,267,315 B1 * | 7/2001 | Blackadder et al. | 242/384 |
| 6,443,382 B1 * | 9/2002 | Bae | 242/382.6 |
| 6,446,899 B1 * | 9/2002 | Smithson et al. | 242/379.1 |
| 6,585,184 B1 | 7/2003 | Park et al. | |
| 7,635,103 B2 * | 12/2009 | Kim et al. | 242/379.1 |
| 7,661,712 B2 * | 2/2010 | Hiramatsu | 280/806 |
| 2003/0116668 A1 * | 6/2003 | Sumiyashiki | 242/376 |
| 2010/0147986 A1 * | 6/2010 | Mori | 242/383.1 |

FOREIGN PATENT DOCUMENTS

| | | |
|---|---|---|
| JP | 04-212655 A | 8/1992 |
| JP | 04-505137 A | 9/1992 |
| JP | H04-283150 A | 10/1992 |
| JP | H05-062360 U | 8/1993 |
| JP | H05-193441 A | 8/1993 |
| JP | H06-087107 U | 12/1994 |
| JP | H08-040201 A | 2/1996 |
| JP | 08-133011 A | 5/1996 |
| JP | H09-272401 A | 10/1997 |
| JP | 2002-019579 A | 1/2002 |
| JP | 2002-515371 A | 5/2002 |
| WO | 90/09910 A1 | 9/1990 |
| WO | 99/59847 A1 | 11/1999 |
| WO | WO 0121459 A1 * | 3/2001 |
| WO | 01/81130 A1 | 11/2001 |

* cited by examiner

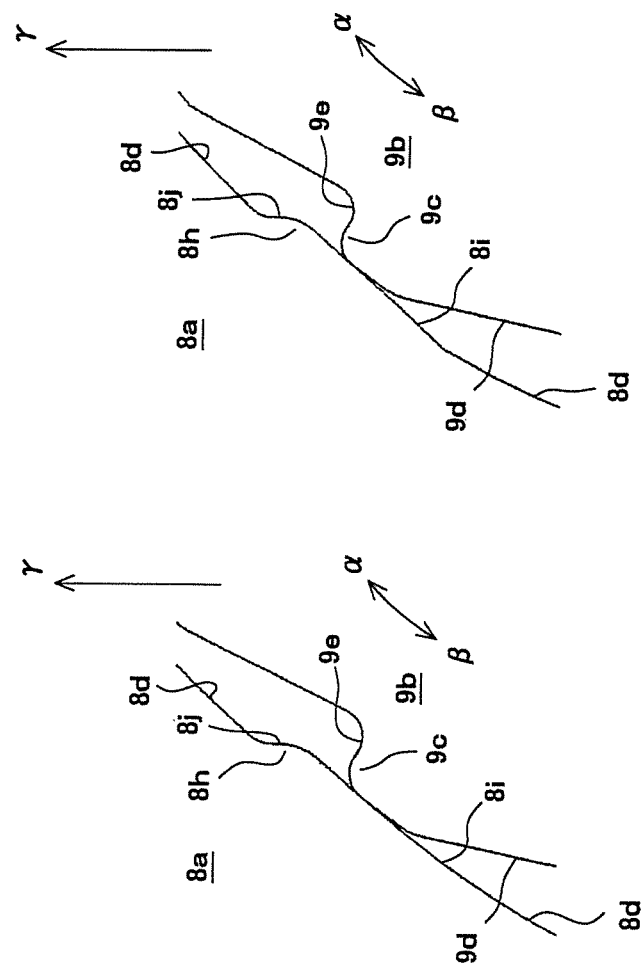

SEAT BELT RETRACTOR AND SEAT BELT APPARATUS INCLUDING THE SAME

CROSS-REFERENCE TO RELATED APPLICATIONS

This application is a National Phase Patent Application of International Patent Application Number PCT/JP2011/003147, filed on Jun. 3, 2011, which claims priority of Japanese Patent Application Number 2010-151268, filed on Jul. 1, 2010, which are hereby incorporated herein by reference in their entirety.

FIELD OF THE INVENTION

The present invention relates to a technical field concerning a seat belt retractor that prevents, in the case of an emergency such as at a collision of a vehicle in which a deceleration that is larger than a specific value is experienced by the vehicle, the withdrawal of a seat belt by locking the rotation of a spool around which the seat belt is to be retracted, and also concerning a seat belt apparatus including the same.

BACKGROUND OF THE INVENTION

Conventionally, a seat belt apparatus included in a vehicle such as an automobile prevents, in the case of an emergency such as at a collision of the vehicle, an occupant from jumping out of the seat by restraining the occupant with a seat belt. Such a seat belt apparatus includes a seat belt retractor that retracts a seat belt. In the seat belt retractor, the seat belt is retracted around a spool when not worn. When the seat belt is to be worn, the seat belt is withdrawn and is fastened around the occupant. In the case of the emergency mentioned above, a locking mechanism included in the seat belt retractor is activated and locks the rotation of the spool in a direction of seat belt withdrawal, whereby the withdrawal of the seat belt is prevented. Thus, the occupant is restrained by the seat belt in the case of an emergency.

As a locking mechanism included in such a conventional seat belt retractor, a locking mechanism of a frame locking type is known (see U.S. Pat. No. 4,796,918, for example). This locking mechanism includes a plurality of external teeth that are provided on a flange of a spool and a plurality of internal teeth that are fewer than the external teeth and are provided on a frame that supports the spool. When a deceleration that is larger than a specific value is experienced by the vehicle, the spool as a whole rotates about a pivot displaced from the position of a rotational shaft of the spool that is for normal usage, causing some of the external teeth to mesh with the internal teeth provided on the frame, whereby the rotation of the spool is locked. In the locking mechanism of the frame locking type disclosed by U.S. Pat. No. 4,796,918, since the internal teeth are provided on the frame, no special members having such internal teeth are necessary. Therefore, the mechanism can have a relatively light weight. Hence, with this locking mechanism, a weight reduction of a vehicle is satisfactorily realized.

In such a locking mechanism of the frame locking type, when some of the external teeth of the spool come into mesh with the internal teeth of the frame, the external teeth of the spool and the internal teeth of the frame may come into contact with each other at the tips thereof. That is, the external teeth and the internal teeth may not mesh properly. If the external teeth are made to mesh with the internal teeth in such an improper state, a large load is applied to the spool via the seat belt with the inertia of the occupant. Therefore, while the plurality of internal teeth are not in mesh with corresponding ones of the plurality of external teeth, the spool abruptly moves in a direction of the load acting on the seat belt. Consequently, one of the external teeth of the spool engages with the last one of the internal teeth of the frame, applying a large load to that internal tooth.

Accordingly, there is another proposal concerning a seat belt retractor in which the tips of external teeth each have a flat portion (see Japanese Patent No. 2950980, for example). Even if some of the external teeth are not properly in mesh with internal teeth, the flat portions of the external teeth first come into contact with the tips of the internal teeth and the spool as a whole then rotates about its pivot, whereby the plurality of internal teeth properly come into mesh with corresponding ones of the external teeth. Thus, the plurality of internal teeth and corresponding ones of the external teeth are more assuredly made to mesh with each other. In the seat belt retractor disclosed by Japanese Patent No. 2950980, any of the external teeth of the spool is prevented from engaging only one of the internal teeth of the frame. Therefore, the load to be applied to the internal teeth can be reduced.

SUMMARY OF THE INVENTION

In the seat belt retractor disclosed by Japanese Patent No. 2950980 described above, the plurality of internal teeth can be made to properly mesh with corresponding ones of the external teeth. However, the movement of the spool is complicated. Specifically, while the flat portions of some of the external teeth are in contact with and slide along the tips of the internal teeth, the spool as a whole rotates about a pivot that is displaced from the position of the rotational shaft of the spool that is for normal usage. Therefore, although the plurality of internal teeth and corresponding ones of the external teeth can be made to properly mesh with each other to some extent, it is difficult to realize more effective and proper meshing between the internal teeth and the external teeth. Hence, there is still a room for improvement in the proper meshing between the plurality of internal teeth and corresponding ones of the external teeth.

In view of the above, the present invention is to provide a seat belt retractor that is capable of realizing proper meshing between a plurality of internal teeth and external teeth corresponding thereto more effectively with a simple movement of a spool, and to provide a seat belt apparatus including the same.

Solution to Problem

To solve the above problem, a seat belt retractor according to the present invention includes a spool around which a seat belt is to be retracted; a frame that includes a first sidewall and a second sidewall and supports the spool while allowing rotation of the spool; a first engaging portion that is provided on one end side of the spool and includes a predetermined number of first external teeth that, in a case of an emergency, come into mesh with a predetermined number of first internal teeth provided on the first sidewall, the first engaging portion locking the rotation of the spool in a direction of seat belt withdrawal when the first external teeth have meshed with the first internal teeth; a second engaging portion that is provided on the other end side of the spool and includes a predetermined number of second external teeth that, in a case of an emergency, come into mesh with a predetermined number of second internal teeth provided on the second sidewall, the second engaging portion locking the rotation of the spool in the direction of seat belt withdrawal when the second external teeth have meshed with the second internal teeth; and a spool guide that guides, when the first external teeth have meshed with the first internal teeth and the other end side of the spool is moved in a direction of seat belt load with a load acting on the seat belt, the other end side of the spool in such a direction that any of the second external teeth of the second engaging portion comes into mesh with one target second internal tooth included in the second internal teeth.

In the seat belt retractor according to the present invention, the first engaging portion is a pawl that is rotatably provided on the one end side of the spool.

Furthermore, in the seat belt retractor according to the present invention, the second internal teeth are provided on a side toward which the seat belt that has been withdrawn from the spool extends and on a side opposite the seat belt that has been withdrawn from the spool with respect to a rotational shaft of the spool.

Furthermore, in the seat belt retractor according to the present invention, the spool guide and the second internal teeth are configured such that, when the other end side of the spool is moved in the direction of seat belt load with the load acting on the seat belt, a force produced by a toggle effect is applied to the other end side of the spool.

A seat belt apparatus according to the present invention includes at least a seat belt retractor that retracts a seat belt, a tongue that is slidably supported by the seat belt that has been withdrawn from the seat belt retractor, and a buckle with which the tongue disengageably engages. The seat belt apparatus is configured to restrain an occupant with the seat belt. The seat belt retractor is any of the above seat belt retractors according to the present invention.

In the seat belt retractor according to the present invention configured as described above, in the case of an emergency, the first engaging portion provided at the one end side of the spool is made to engage with the first internal teeth provided on the first sidewall of the frame, and the other end side of the spool is moved in the direction of seat belt load with the load acting on the seat belt, whereby the other end side of the spool is brought into contact with the spool guide. Since the other side end of the spool tends to move further in the direction of seat belt load with the load acting on the seat belt, the spool guide brings one of the second external teeth provided at the other end side of the spool into contact with one target second internal tooth of the frame. Hence, some of the second external teeth of the spool that face the second internal teeth of the frame can be made to mesh properly with the respective second internal teeth more effectively. In this case, only the other side end of the spool is moved while being guided along the spool guide. Therefore, some of the second external teeth of the spool can be made to mesh with the respective second internal teeth of the frame more effectively with a simple movement of the spool.

Furthermore, the toggle effect enhances the engagement between the second external tooth and the target second internal tooth. Hence, some of the second external teeth of the spool can be made to mesh with the respective second internal teeth of the frame much more effectively.

Particularly, if the distance from a point of contact between the spool guide and the other side end of the spool to a point of contact between the one second external tooth at the other end side of the spool and the one target second internal tooth of the frame is maximized, the force with which the second external tooth pushes the second internal tooth can be reduced. Correspondingly, the moment occurring on each of the second external teeth is reduced. Hence, the strength of the second external teeth and the strength of the second internal teeth can be reduced. Therefore, the thickness of the frame can be reduced. Furthermore, the spool does not need to be made of a highly stiff material. Consequently, the seat belt retractor can be provided in a light and compact body and at a low cost.

In the seat belt apparatus including the seat belt retractor according to the present invention, some of the second external teeth at the other end side of the spool and the second internal teeth of the frame can be made to mesh with each other more effectively with a simple movement of the spool. Therefore, in the case of the emergency described above, the occupant can be restrained by the seat belt more effectively.

BRIEF DESCRIPTION OF THE DRAWINGS

FIG. 4(A) is an enlarged view illustrating a part including a spool guide according to the embodiment, and FIG. 4(B) is an enlarged view illustrating a part including a spool guide included in another exemplary embodiment of the seat belt retractor according to the present invention and corresponds to FIG. 4(A).

DETAILED DESCRIPTION OF THE PREFERRED EMBODIMENTS

Embodiments of the present invention will now be described with reference to the drawings.

Figure 1:
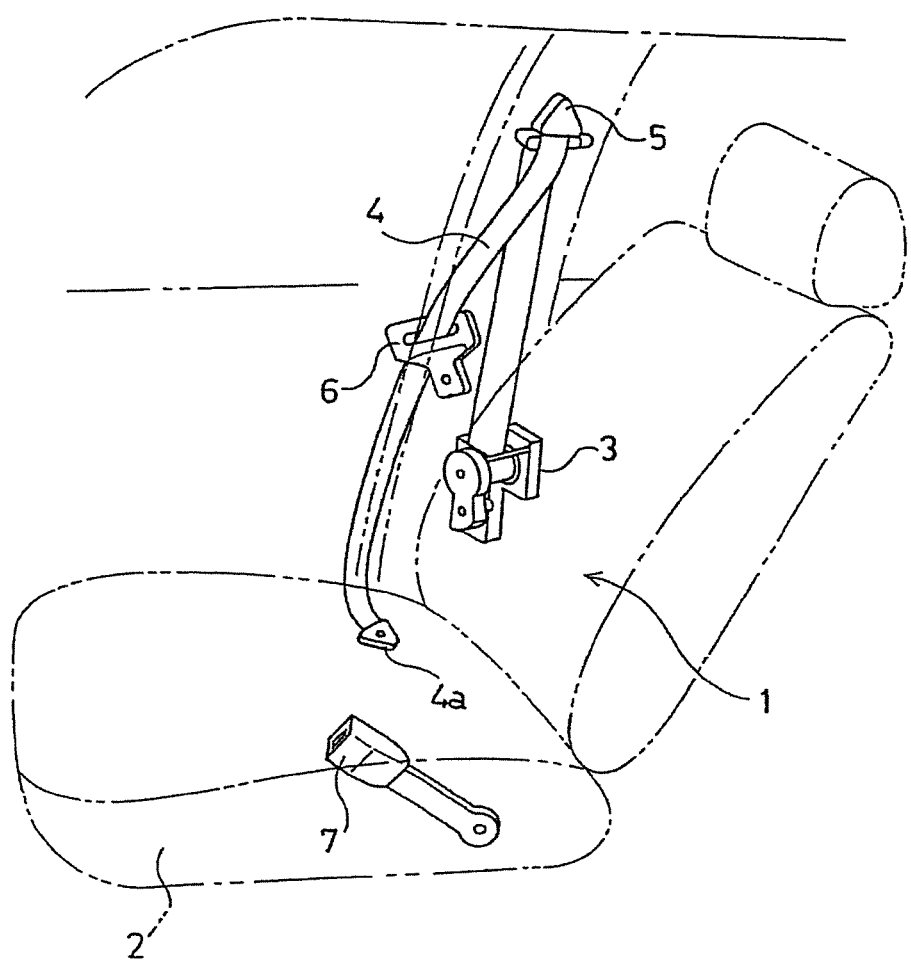
FIG. 1 is a schematic diagram of a seat belt apparatus including an exemplary embodiment of the seat belt retractor according to the present invention.
Figure 2:
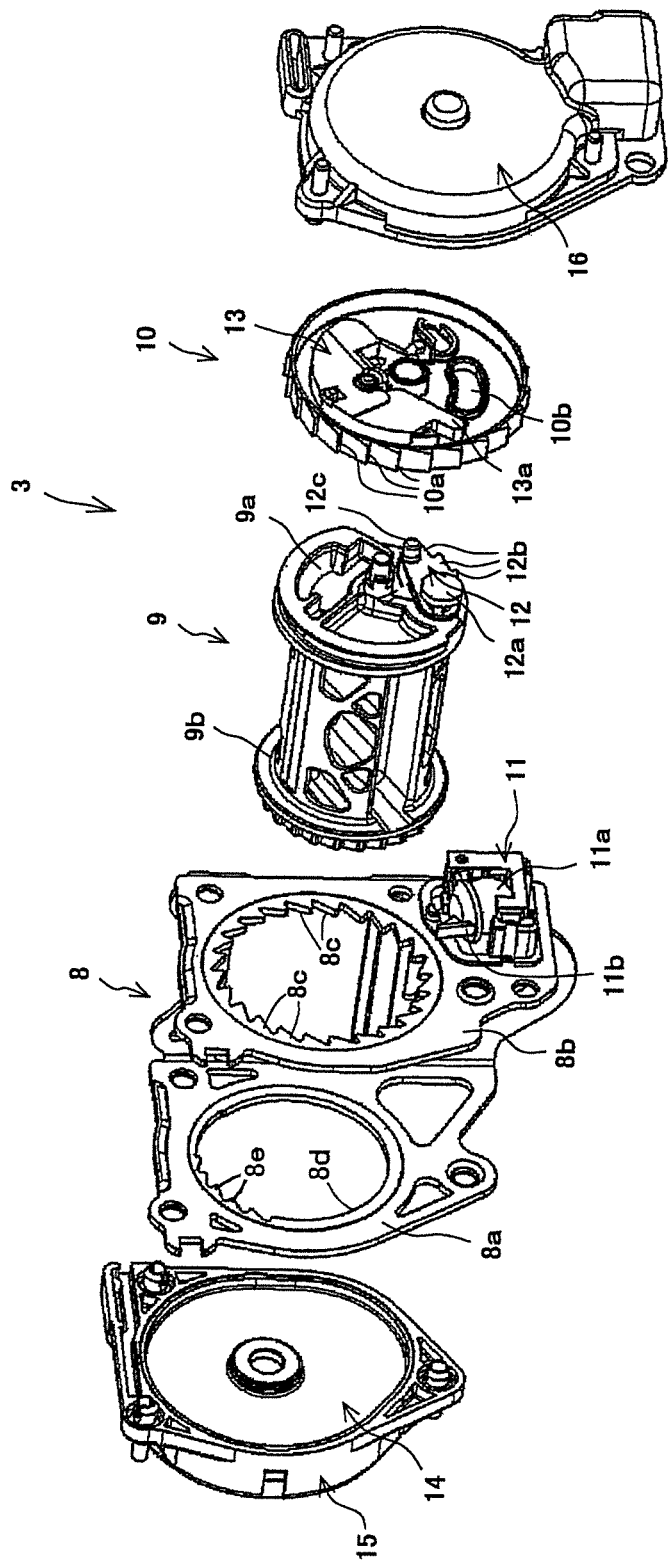
FIG. 2 is a schematic exploded perspective view of a seat belt retractor according to the embodiment.

FIG. 1 is a schematic diagram of a seat belt apparatus including an exemplary embodiment of the seat belt retractor according to the present invention. FIG. 2 is a schematic exploded perspective view of a seat belt retractor according to the embodiment.

As illustrated in FIG. 1, a seat belt apparatus 1 according to the embodiment is basically the same as a conventionally known three-point seat belt apparatus. Referring to the drawing, reference numeral 1 denotes the seat belt apparatus. Reference numeral 2 denotes a vehicle seat. Reference numeral 3 denotes a seat belt retractor provided near the vehicle seat 2. Reference numeral 4 denotes a seat belt that is to be withdrawably retracted by the seat belt retractor 3 and has a belt anchor 4a provided at the leading end thereof. The belt anchor 4a is configured to be secured to the floor of a vehicle body or to the vehicle seat 2. Reference numeral 5 denotes a guide anchor that guides, toward a shoulder of an occupant, the seat belt 4 that has been withdrawn from the seat belt retractor 3. Reference numeral 6 denotes a tongue that is slidably supported by the seat belt 4 that has been guided from the guide anchor 5. Reference numeral 7 denotes a buckle that is fixed to the floor of the vehicle body or to the vehicle seat and disengageably engages with the tongue 6 that is to be inserted thereinto.

Operations of fastening and releasing the seat belt 4 of the seat belt apparatus 1 are also the same as those of the conventionally known seat belt apparatus.

As illustrated in FIG. 2, the seat belt retractor 3 according to the embodiment is a conventionally known emergency-locking seat belt retractor (ELR) and is basically the same as a seat belt retractor disclosed by Japanese Unexamined Patent Application Publication No. 5-193441. The seat belt retractor according to the present invention is not limited to such a seat belt retractor and may be any other ELR or a conventionally known automatic-locking seat belt retractor (ALR).

The basic configuration and the basic operation of the seat belt retractor 3 according to the embodiment are the same as those of the seat belt retractor disclosed by Japanese Unexamined Patent Application Publication No. 5-193441 as mentioned above, and details thereof are easily understandable by referring to Japanese Unexamined Patent Application Publication No. 5-193441. Therefore, description of the details is omitted. Herein, configurations and operations that are common to the two will be described briefly.

Referring to FIG. 2, reference numeral 8 denotes a frame having a rectangular U shape and including left and right sidewalls 8a and 8b. Reference numeral 9 denotes a spool that is indirectly and rotatably supported by the left and right sidewalls 8a and 8b and around which the seat belt 4 is to be retracted. Reference numeral 10 denotes a locking gear that is coaxially supported by the spool 9 in such a manner as to be rotatable relative to the spool 9 and includes a plurality of external teeth 10a, which are provided in a ring shape, and a cam hole 10b. Reference numeral 11 denotes a deceleration sensing mechanism (a vehicle sensor) that is provided on the right sidewall 8b (a first sidewall) of the frame 8 and includes an inertia ball 11a and a catch 11b. The catch 11b is engageable with any of the external teeth 10a of the locking gear 10. Reference numeral 12 denotes a pawl (a first engaging portion) that is provided at a right side end 9a (one end side) of the spool 9 in such a manner as to be rotatable about a rotational pin 12a and includes a predetermined number of, specifically, two or more, external teeth 12b (first external teeth) and a pin-shaped cam follower 12c. The external teeth 12b are meshable with a predetermined number of internal teeth 8c (first internal teeth) included in a plurality of internal teeth 8c that are provided in a ring shape on the right sidewall 8b of the frame 8. Reference numeral 13 denotes an abrupt-seat-belt-withdrawal-sensing inertia member (a webbing sensor) that is rockably supported by the locking gear 10 and includes a catch 13a. Reference numeral 14 denotes a spring mechanism that constantly urges the spool 9 in a direction of seat belt retraction. Reference numeral 15 denotes a spring case that is provided on the left sidewall 8a (a second sidewall) of the frame 8 and covers the spring mechanism 14. Reference numeral 16 denotes a cover that is provided on the right sidewall 8b of the frame 8 and covers the locking gear 10, the deceleration sensing mechanism 12, and the pawl 12. In the seat belt retractor disclosed by Japanese Unexamined Patent Application Publication No. 5-193441, a pawl that is the same as the pawl 12 is also provided at a left side end 9b (the other end side) of the spool 9 in such a manner as to be rotatable together with the rotation of the pawl 12. In the seat belt retractor 3 according to the embodiment, no pawl is provided at the left side end 9b of the spool 9. In the embodiment, the internal teeth 8c of the frame 8 and the pawl 12 in combination function as a first locking mechanism that locks the rotation of the spool 9 in a direction of seat belt withdrawal a in the case of an emergency. The catch 13a of the abrupt-seat-belt-withdrawal-sensing inertia member 13 and internal teeth (not illustrated) provided in a ring shape on the cover 16 in combination function as a second locking mechanism that locks the rotation of the spool 9 in the direction of seat belt withdrawal a when the seat belt 4b is withdrawn more abruptly than in normal times.

In normal times, when the seat belt is retracted or is withdrawn, the locking gear 10 rotates together with the spool 9. In this case, the pawl 12 of the spool 9 does not engage with the internal teeth 8c of the frame 8, and the catch 13a of the abrupt-seat-belt-withdrawal-sensing inertia member 13 does not engage with the internal teeth provided in a ring shape on the cover. Therefore, the first and second locking mechanisms do not operate, allowing the spool 9 to rotate both in the direction of seat belt retraction and in the direction of seat belt withdrawal.

In the case of the emergency mentioned above in which a large deceleration is experienced by the vehicle, the inertia ball 11a of the deceleration sensing mechanism 11 operates with the deceleration and causes the catch 11b of the deceleration sensing mechanism 11 to engage with one of the external teeth 10a of the locking gear 10. This locks the rotation of the locking gear 10 in the direction of seat belt withdrawal. Meanwhile, the rotation of the spool 9 in the direction of seat belt withdrawal is not locked. Therefore, the spool 9 rotates in the direction of seat belt withdrawal with the inertia of the occupant exerted through the seat belt 4. That is, a relative rotation occurs between the spool 9 and the locking gear 10. With this relative rotation, the cam hole 10b of the locking gear 10 activates and controls the cam follower 12c. Accordingly, the pawl 12 of the spool 9 rotates and engages with some of the internal teeth 8c of the frame 8. This locks the rotation of the spool 9 in the direction of seat belt withdrawal. Thus, the withdrawal of the seat belt 4 is prevented. Consequently, the occupant is restrained by the seat belt 4.

When the seat belt 4 is withdrawn at a speed far greater than the normal speed such as a speed of seat belt withdrawal for fastening, the abrupt-seat-belt-withdrawal-sensing inertia member 13 rocks significantly with respect to the spool 9 because of inertial delay, causing the catch 13a to engage with one of the internal teeth (not illustrated) provided in a ring shape on the cover 16. This locks the rotation of the locking gear 10 in the direction of seat belt withdrawal. Thus, a relative rotation occurs between the spool 9 and the locking gear 10. With this relative rotation, as in the case of the emergency described above, the pawl 12 of the spool 9 engages with some of the internal teeth 8c of the frame 8. This locks the rotation of the spool 9 in the direction of seat belt withdrawal. Thus, the withdrawal of the seat belt 4 is prevented.

Now, configurations and operations of the seat belt retractor 3 according to the embodiment that are different from those of the seat belt retractor disclosed by Japanese Unexamined Patent Application Publication No. 5-193441 will be described.

Figure 3A:
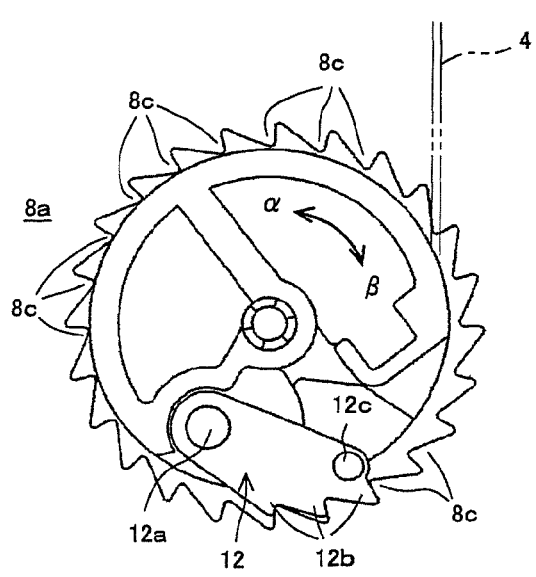
FIG. 3(A) is a diagram of a spool seen from the right side of FIG. 1 and illustrating the right side end thereof and associated elements.
Figure 3B:
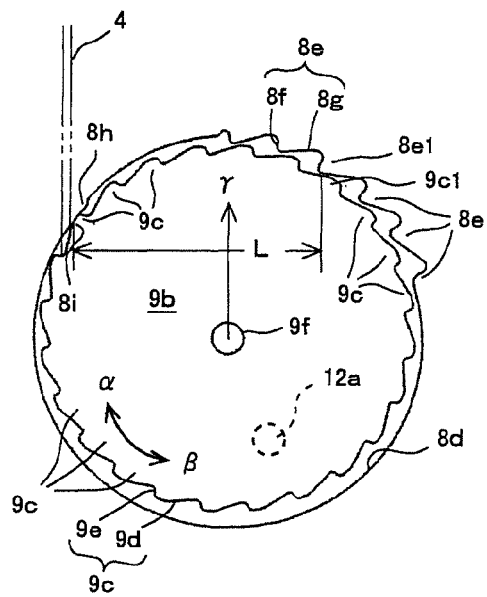
FIG. 3(B) is a diagram of the spool seen from the left side of FIG. 1 and illustrating the left side end thereof and associated elements.

FIG. 3(A) is a diagram of the spool seen from the right side of FIG. 1 and illustrating the right side end thereof and associated elements. FIG. 3(B) is a diagram of the spool seen from the left side of FIG. 1 and illustrating the left side end thereof and associated elements.

As illustrated in FIG. 3(A), the right side end 9a of the spool 9 is basically the same as that of the seat belt retractor disclosed by Japanese Unexamined Patent Application Publication No. 5-193441 mentioned above.

As illustrated in FIG. 3(B), the left side end 9b of the spool 9 is provided with a gear (a second engaging portion) having a plurality of external teeth 9c (second external teeth) provided in a ring shape over the entirety of the outer circumference thereof. The external teeth 9c all have a substantially triangular shape. In this case, a surface 9d of each external tooth 9c that faces a direction opposite to the direction of seat belt withdrawal a gently slopes at a relatively small sloping angle with respect to the outer circumferential direction of the left side end 9b, whereas a surface 9e of each external tooth 9c that faces a direction opposite to the direction of seat belt retraction p slopes at a large sloping angle with respect to the outer circumferential direction of the left side end 9b. The surface 9d having a small sloping angle slightly curves in such a manner as to swell outward.

The left sidewall 8a of the frame 8 has a relatively large circular hole 8d in which the left side end 9b of the spool 9 having the external teeth 9c fits with play. The circular hole 8d has on the inner circumferential surface thereof a predetermined number of, specifically, two or more, internal teeth 8e (second internal teeth). The internal teeth 8e are provided on a side toward which the seat belt 4 that has been withdrawn from the spool 9 extends and on a side opposite the seat belt 4 that has been withdrawn from the spool 9 with respect to a rotational shaft 9f of the spool 9. In this case, the tips of the internal teeth 8e are on an arc defined by a specific circle.

The internal teeth 8e all have a substantially triangular shape. In this case, a surface 8f of each internal tooth 8e that faces the direction opposite to the direction of seat belt withdrawal a slopes at a relatively large sloping angle with respect to the inner circumferential direction of the circular hole 8d, whereas a surface 8g of each internal tooth 8e that faces the direction opposite to the direction of seat belt retraction β gently slopes at a relatively sloping angle with respect to the inner circumferential direction of the circular hole 8d. Some of the external teeth 9c of the spool 9 that come to face the internal teeth 8e of the frame 8 are meshable with the respective internal teeth 8e. The internal teeth 8e and the external teeth 9c in combination function as a third locking mechanism that locks the rotation of the spool 9 in the direction of seat belt withdrawal a at least in the case of an emergency.

The inner circumferential surface of the circular hole 8d also has a projection-type spool guide 8h provided on the side toward which the seat belt 4 that has been withdrawn from the spool 9 extends and on a side having the seat belt 4 that has been withdrawn from the spool 9 with respect to the rotational shaft 9f of the spool 9. As illustrated in FIG. 4(A), the spool guide 8h includes a surface 8i that faces the direction opposite to the direction of seat belt withdrawal α. The surface 8i gently slopes at a relatively small sloping angle with respect to the circumferential direction of the circular hole 8d and forms a curved guide surface 8i. The spool guide 8h also includes a surface 8j that faces the direction opposite to the direction of seat belt retraction β. The surface 8j slopes at a relatively large sloping angle with respect to the circumferential direction of the circular hole 8d. The boundary between the guide surface 8i and the surface 8j forms a rounded corner. The inner circumferential surface of the circular hole 8d and the guide surface 8i are smoothly continuous with each other in such a manner as to form a curved surface.

As illustrated in FIG. 3(B), when a load acting on the seat belt 4 is applied to the spool 9 in a direction of seat belt load γ, the left side end 9b of the spool 9 moves in the direction of seat belt load γ and one of the external teeth 9c comes into contact with the guide surface 8i of the spool guide 8h. Since the left side end 9b of the spool 9 tends to move further in the direction of seat belt load γ, the guide surface 8i guides the left side end 9b of the spool 9 such that some of the external teeth 9c of the spool 9 that face the internal teeth 8e of the frame 8 are brought toward the internal teeth 8e. In this situation, the guide surface 8i guides the left side end 9b of the spool 9 such that the surface 9d of one external tooth $9c_1$ of the spool 9 comes into contact with the surface 8g of one target internal tooth $8e_1$. The direction of rotation of the spool 9 varies significantly with the internal teeth 8c. Therefore, without the guide surface 8i described above, the external tooth $9c_1$ of the spool 9 may not come into contact with the surface 8g of the target internal tooth $8e_1$ at substantially the same position thereof. Hence, the guiding of the left side end 9b of the spool 9 by the guide surface 8i allows the external tooth $9c_1$ to assuredly come into contact with the target internal tooth $8e_1$ at substantially the same position thereof, regardless of the variations in the direction of rotation of the spool 9.

The surface 9d of the external tooth $9c_1$ of the spool 9 and the surface 8g of the internal tooth $8e_1$ of the frame 8 are configured such that, after the surface 9d has come into contact with the surface 8g, the left side end 9b of the spool 9 that tends to move in the direction of seat belt load γ resists the guiding of the left side end 9b of the spool 9 by the guide surface 8i. That is, when the guide surface 8i of the spool guide 8h and the surface 8g of the internal tooth $8e_1$ act to move the left side end 9b of the spool 9 in the direction of seat belt load γ, a toggle effect is exerted in which a large force is applied to the left side end 9b of the spool 9. The toggle effect enhances the engagement between the external tooth $9c_1$ and the internal tooth $8e_1$, preventing the external tooth $9c_1$ from sliding over, or skipping, the internal tooth $8e_1$.

Furthermore, the target internal tooth $8e_1$ is set to one of the internal teeth 8e with which a distance L between a point at which the surface 9d of the external tooth $9c_1$ comes into contact with the surface 8g of the internal tooth $8e_1$ and a point of contact between one of the external teeth 9c and the guide surface 8i is maximized. When the surface 9d of the external tooth $9c_1$ comes into contact with the surface 8g of the internal tooth $Be_i$, a torque occurs on the spool 9 with a load acting on the seat belt 4 in the direction of seat belt load γ. Hence, maximizing the distance L reduces a force produced by the torque and with which the external tooth $9c_1$ pushes the internal tooth $8e_1$.

Figure 3C:
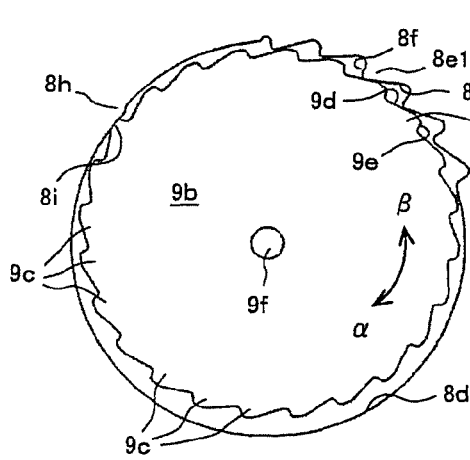
FIG. 3(C) illustrates a process of meshing between external teeth provided on the spool and internal teeth provided on a frame and corresponds to FIG. 3(B)
Figure 3D:
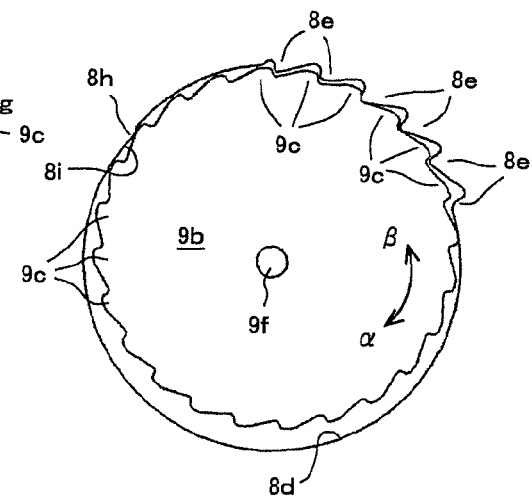
FIG. 3(D) illustrates a state where the external teeth provided on the spool and the internal teeth provided on the frame are in mesh with each other and corresponds to FIG. 4(B).

In the seat belt retractor 3 according to the embodiment configured as described above, when the cam hole 10b of the locking gear 10 activates and controls the cam follower 12c in the case of the emergency described above, the pawl 12 rotates about the rotational pin 12a. The rotation of the pawl 12 causes the external teeth 12b of the pawl 12 to mesh with some of the internal teeth 8c of the frame 8 as illustrated in FIG. 3(A). Then, with the load acting on the seat belt 4 in the direction of seat belt load γ, the left side end 9b of the spool 9 moves in the direction of seat belt load γ while rotating about the rotational pin 12a. Then, as illustrated in FIG. 3(B), one of the external teeth 9c comes into contact with the guide surface 8i. Since the left side end 9b of the spool 9 tends to move further in the direction of seat belt load γ, the left side end 9b of the spool 9 is guided by the guide surface 8i in such a direction that the external teeth 9c are brought toward the internal teeth 8e. Thus, the surface 9d of one external tooth $9c_1$ of the spool 9 comes into contact with the surface 8g of one target internal tooth $8e_1$ of the frame 8. Therefore, the tip of the external tooth $9c_1$ is prevented from coming into contact with the tip of the internal tooth $8e_1$. In addition, as illustrated in FIG. 3(C), since the left side end 9b of the spool 9 tends to move in the direction of seat belt load γ, the left side end 9b of the spool 9 is guided by the guide surface 8i in the same direction and the surface 9d of the external tooth $9c_1$ of the spool 9 is guided by the surface 8g of the internal tooth $8e_1$ of the frame 8. Thus, some of the external teeth 9c of the spool 9 that face the internal teeth 8e of the frame 8 come into mesh properly with the respective internal teeth 8e. Ultimately, as illustrated in FIG. 3(D), the above external teeth 9c of the spool 9 are in mesh with the respective internal teeth 8e more effectively.

In the seat belt retractor 3 according to the embodiment, in the case of an emergency, the pawl 12 at the right side end 9a of the spool 9 is made to engage with the internal teeth 8c provided on the right sidewall 8b of the frame 8, and the external teeth 9c at the left side end 9b of the spool 9 are moved in the direction of seat belt load γ with the load acting on the seat belt 4, whereby one of the external teeth 9c is brought into contact with the guide surface 8i of the spool guide 8h. Since the left side end 9b of the spool 9 tends to move further in the direction of seat belt load γ with the load acting on the seat belt 4, the guide surface 8i brings the surface 9d of one external tooth $9c_1$ of the spool 9 into contact with the surface 8g of one target internal tooth $8e_1$. Hence, some of the external teeth 9c of the spool 9 that face the internal teeth 8e of the frame 8 can be made to mesh properly with the respective internal teeth 8e more effectively. In this case, only the left side end 9b of the spool 9 is moved while being guided along the spool guide 8h. Therefore, some of the external teeth 9c of the spool 9 can be made to mesh with the respective internal teeth 8e of the frame 8 more effectively with a simple movement of the spool 9.

Particularly, as described above, the toggle effect enhances the engagement between the external tooth $9c_1$ and the target internal tooth $8e_1$. Hence, some of the external teeth 9c of the spool 9 can be made to mesh with the respective internal teeth 8e of the frame 8 much more effectively.

Moreover, if the distance L described above is maximized, the force with which the external tooth $9c_1$ pushes the internal tooth $8e_1$ can be reduced. Correspondingly, the moment occurring on each of the external teeth 9c is reduced. Hence, the strength of the external teeth 9c and the strength of the internal teeth 8e can be reduced. Therefore, the thickness of the frame 8 can be reduced. Furthermore, the spool 9 does not need to be made of a highly stiff material. Consequently, the seat belt retractor 3 can be provided in a light and compact body and at a low cost.

In the seat belt apparatus 1 including the seat belt retractor 3 according to the embodiment, the external teeth 9c of the spool 9 and the internal teeth 8e of the frame 8 can be made to mesh with each other more effectively with a simple movement of the spool 9. Therefore, in the case of the emergency described above, the occupant can be restrained by the seat belt 4 more effectively.

FIG. 4(B) is a diagram illustrating a part of another embodiment of the seat belt retractor according to the present invention and corresponds to FIG. 4(A).

In the above embodiment illustrated in FIG. 4(A), the guide surface 8i of the spool guide 8h forms a curved surface. In the seat belt retractor 3 according to the embodiment illustrated in FIG. 4(B), the guide surface 8i of the spool guide 8h forms a flat surface. The inner circumferential surface of the circular hole 8d and the guide surface 8i are smoothly continuous with each other in such a manner as to form a curved surface. The other elements of the seat belt retractor 3 according to this embodiment have the same configurations as those of the embodiment described above and illustrated in FIGS. 1 and 2.

The seat belt retractor 3 according to this embodiment also produces the same operational effects as those produced in the above embodiment. The configuration and the operational effects of a seat belt apparatus 1 including the seat belt retractor 3 according to this embodiment are also the same as those described in the above embodiment.

The present invention is not limited to the above embodiments, and various design changes can be made thereto. For example, while the above embodiments each concern a case where a pawl as a first engaging portion is provided on one end side of the spool 9, the pawl may be replaced with a gear having external teeth, as with the seat belt retractors disclosed by PTL 1 and PLT 2 described above. That is, various design changes can be made to the embodiments within the technical scope defined by the claims.

The seat belt retractor and the seat belt apparatus according to the present invention are suitably applicable to a seat belt retractor and a seat belt apparatus that prevent, in the case of an emergency such as at a collision of a vehicle in which a deceleration that is larger than a specific value is experienced by the vehicle, the withdrawal of a seat belt by locking the rotation of a spool around which the seat belt is to be retracted.

The invention claimed is:

1. A seat belt retractor comprising:
    a spool around which a seat belt is to be retracted;
    a frame that includes a first sidewall and a second sidewall and supports the spool while allowing rotation of the spool;
    a first engaging portion that is provided on one end side of the spool and includes a predetermined number of first external teeth that, in a case of an emergency, come into mesh with a predetermined number of first internal teeth provided on the first sidewall, the first engaging portion locking the rotation of the spool in a direction of seat belt withdrawal when the first external teeth have meshed with the first internal teeth;
    a second engaging portion that is provided on the other end side of the spool and includes a predetermined number of second external teeth that, in a case of an emergency, come into mesh with a predetermined number of second internal teeth provided on the second sidewall, the second engaging portion locking the rotation of the spool in the direction of seat belt withdrawal when the second external teeth have meshed with the second internal teeth; and
    a spool guide that guides, when the first external teeth have meshed with the first internal teeth and the other end side of the spool is moved in a direction of seat belt load with a load acting on the seat belt, the other end side of the spool in such a direction that any of the second external teeth of the second engaging portion comes into mesh with one target second internal tooth included in the second internal teeth;
    the second sidewall has a circular hole and the second internal teeth are on an inner circumferential surface extending about the circular hole,
    the second external teeth of the spool fit with play in the circular hole and some of the second external teeth are meshable with the respective second internal teeth of the second engaging portion on the other end side of the spool that is moved in the direction of seatbelt load with the load acting on the seat belt,
    the spool guide is provided on the inner circumferential surface extending about the circular hole.

2. The seat belt retractor according to claim 1, wherein the first engaging portion is a pawl that is rotatably provided on the one end side of the spool.

3. The seat belt retractor according to claim 1, wherein the second internal teeth are provided on a side toward which the seat belt that has been withdrawn from the spool extends and on a side opposite the seat belt that has been withdrawn from the spool with respect to a rotational shaft of the spool.

4. The seat belt retractor according to claim 1, wherein the spool guide and the second internal teeth are configured such that, when the other end side of the spool is moved in the direction of seat belt load with the load acting on the seat belt, a force produced by a toggle effect is applied to the other end side of the spool.

5. A seat belt apparatus comprising at least a seat belt retractor that retracts a seat belt; a tongue that is slidably supported by the seat belt that has been withdrawn from the seat belt retractor; and a buckle with which the tongue disengageably engages, the seat belt apparatus being configured to restrain an occupant with the seat belt,
   wherein the seat belt retractor is the seat belt retractor according to claim 1.

6. The seat belt retractor according to claim 1, wherein the spool guide comprises a projection-type spool guide.

7. The seat belt retractor according to claim 6, wherein the projection-type spool guide includes a first surface that faces the direction opposite to the direction of seat belt withdrawal, with the first surface gently sloping at a relatively small sloping angle with respect to the circumferential direction of the circular hole and forming a curved guide surface, a second surface that faces the direction opposite to the direction of seat belt retraction, with the second surface sloping at a relatively large sloping angle with respect to the circumferential direction of the circular hole, and a boundary between the first surface and the second surface that forms a rounded corner therebetween.

* * * * *